United States Patent [19]
Detlefs et al.

[11] Patent Number: 6,161,217
[45] Date of Patent: Dec. 12, 2000

[54] ACCURATE METHOD FOR INLINING VIRTUAL CALLS

[75] Inventors: David L. Detlefs, Westford; Ole Agesen, Needham, both of Mass.

[73] Assignee: Sun Microsystems, Inc., Palo Alto, Calif.

[21] Appl. No.: 09/152,735

[22] Filed: Sep. 14, 1998

[51] Int. Cl.$^7$ .................................................. G06N 9/45
[52] U.S. Cl. .................................................. 717/5
[58] Field of Search ................ 717/5, 7, 9; 395/705

[56] References Cited

U.S. PATENT DOCUMENTS

| | | | |
|---|---|---|---|
| 5,481,708 | 1/1996 | Kukol | 717/9 |
| 5,579,518 | 11/1996 | Yasumatsu | 717/5 |
| 5,815,719 | 9/1998 | Goebel | 717/7 |
| 5,835,771 | 11/1998 | Veldhuizen | 717/5 |
| 5,845,331 | 12/1998 | Carter et al. | 711/163 |
| 6,003,123 | 12/1999 | Carter et al. | 711/207 |

OTHER PUBLICATIONS

Title: Implementation Benefits of C++ Language Mechanisms, Author: David Jordan, ACM 1990.
Title: "The Direct Cost of Virtual Function Calls in C++", Author: Driesen and Holzle, ACM, 1996.
Title: "Optimizing direct threaded code by selective inlining", Author: Piumarta et al, ACM, 1998.
Title: "An Evaluation of Automatic Object Inline Allocation Techniques", Author: Dolby et al, ACM, 1998.
Title "Inlining of Virtual Methods", Author: Detlefs and Agesen, appear in ECOOP, 1999.
Ungar et al., Architecture of SOAR: Smalltalk on a RISC, Proceedings of the Annual International Symposium on computer Arichtecture, vol. 11, 1984, pp. 188–197.
Deutsch et al., Efficient Implementation of the Smalltalk–80 System, Conference Record of the 11th Annual ACM Symposium in Principles of Programming Languages, 1984, pp. 297–302.

*Primary Examiner*—Tariq R. Hafiz
*Assistant Examiner*—Chameli Chaudhuri Das
*Attorney, Agent, or Firm*—Cesari and McKenna, LLP

[57] ABSTRACT

A computer system (10) is configured as a compiler to translate source code (FIG. 4) into object code (FIG. 6). The source code calls a polymorphic method on a receiver object. The compiler inlines the polymorphic method and guards the inlining with guard code that causes the executing microprocessor to skip the inlining in favor of a virtual method call when it determines that the inlined code is not appropriate for the receiver object. To make that determination, the guard code compares the address of the method version that has been inlined with the receiver object's pointer to its version of the polymorphic method.

24 Claims, 7 Drawing Sheets

```
class A {
    public float w;
    public float h;
    public float m1() {        // Defines member method
        return w*h;
    }
    .
    .
    .
} class B extends A {            // Inherits w, h, and m1
    float d;
} class C extends A {
    float m₁() {               // Overrides m1
        return w*h/2;
    }
    .
    .
    .
}
```

FIG. 3

```
A a = new A();                 void foo(A o) {
a.h = 4;                           float area;
a.w = 2;                           area = o.m1();
foo(a);                            .
                                   .
                                   .
                               }
```

FIG. 4

|   |       |                    |                                              |
|---|-------|--------------------|----------------------------------------------|
|   | or    | %g0, %i1,%o0       | %% PUT POINTER TO RECEIVER OBJECT INTO %o0   |
|   | lduw  | [%o0 + 0], %g2     | %% PUT POINTER TO RECEIVER'S CLASS INTO %g2  |
|   | sethi | %hi(0x120000), %g1 | %% PUT POINTER TO INLINED METHOD'S           |
|   | add   | %g1, 712, %g1      | %%   CLASS INTO %g1                          |
|   | subcc | %g1, %g2, %g0      | %% COMPARE                                   |
| w | bne   | k                  | %% IF DIFFERENT, SKIP TO VIRTUAL CALL        |
|   | nop   |                    | %% (NOTHING TO DO DURING BRANCH DELAY)       |
|   | .     |                    |                                              |
|   | .     |                    | %% [INLINING]                                |
|   | .     |                    |                                              |
| x | ba,a  | 5                  | %% END OF INLINED METHOD; SKIP VIRTUAL CALL  |
| w+k | lduw | [%g2 + 92], %g3   | %% VIRTUAL CALL: LOAD METHOD'S ADDRESS       |
|   | jmpl  | [%g3 + %g0], %o7   | %% JUMP TO THAT ADDRESS                      |
|   | nop   |                    | %% (NOTHING TO DO DURING JUMP DELAY)         |
|   | or    | %g0, %o0, %l0      | %% PUT RESULT INTO %l0;                      |
| x+5 |     |                    |                                              |

FIG. 5
(PRIOR ART)

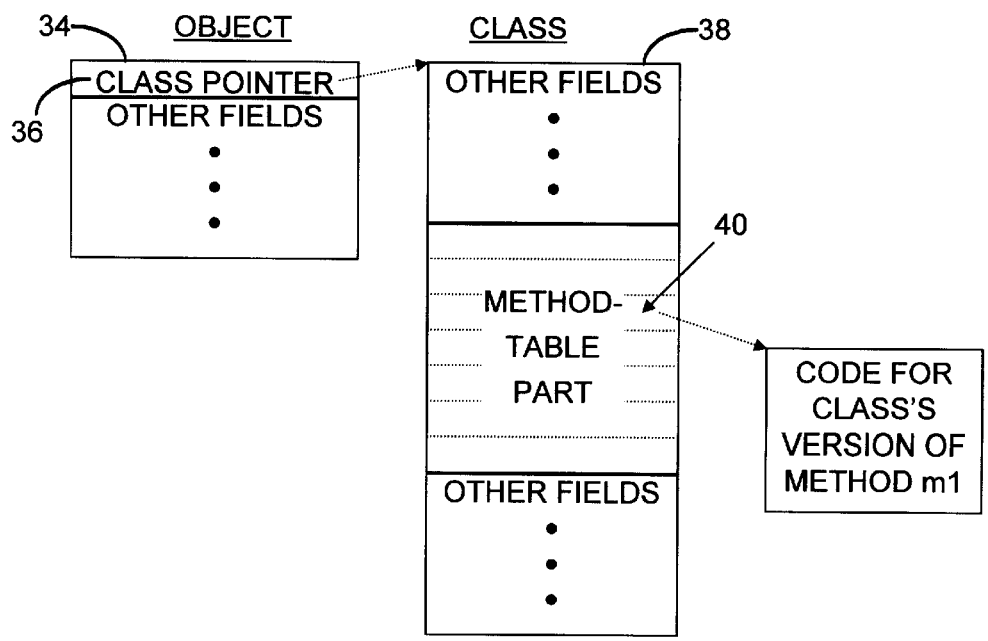

FIG. 8

|   |       |                      |    |                                                 |
|---|-------|----------------------|----|-------------------------------------------------|
|   | or    | %g0, %i1,%o0         | %% | PUT POINTER TO RECEIVER OBJECT INTO %o0         |
|   | lduw  | [%o0 + 0], %g2       | %% | PUT POINTER TO RECEIVER'S CLASS INTO %g2        |
|   | lduw  | [%g2 + 92], %g3      | %% | PUT POINTER TO RECEIVER CLASS'S VERSION OF METHOD INTO %g3 |
|   | sethi | %hi(0x130000), %g1   | %% | PUT POINTER TO INLINED METHOD                   |
|   | add   | %g1, 132, %g1        | %% | INTO %g1                                        |
|   | subcc | %g1, %g3, %g0        | %% | COMPARE                                         |
| w | bne   | k                    | %% | IF DIFFERENT, SKIP TO VIRTUAL CALL              |
|   | nop   |                      | %% | (NOTHING TO DO DURING BRANCH DELAY)             |
|   | .     |                      |    |                                                 |
|   | .     |                      | %% | [INLINING]                                      |
|   | .     |                      |    |                                                 |
| x | ba,a  | 4                    | %% | END OF INLINED METHOD; SKIP VIRTUAL CALL        |
| w+k | jmpl | [%g3 + %g0], %o7    | %% | VIRTUAL CALL: JUMP TO METHOD'S ADDRESS          |
|   | nop   |                      | %% | (NOTHING TO DO DURING JUMP DELAY)               |
|   | or    | %g0, %o0, %i0        | %% | PUT RESULT INTO %i0;                            |
| x+4 |     |                      |    |                                                 |

FIG. 7

ACCURATE METHOD FOR INLINING VIRTUAL CALLS

BACKGROUND OF THE INVENTION

The present invention is directed to compiling computer programs. It particularly concerns so-called inlining of virtual methods.

FIG. 1 depicts a typical computer system 10. A microprocessor 12 receives data, and instructions for operating on them, from on-board cache memory or further cache memory 18, possibly through the mediation of a cache controller 20, which can in turn receive such data from system read/write memory ("RAM") 22 through a RAM controller 24, or from various peripheral devices through a system bus 26.

The RAM 22's data and instruction contents will ordinarily have been loaded from peripheral devices such as a system disk 27. Other sources include communications interface 28, which can receive instructions and data from other computer systems.

The instructions that the microprocessor executes are machine instructions. Those instructions are ultimately determined by a programmer, but it is a rare programmer who is familiar with the specific machine instructions in which his efforts eventually result. More typically, the programmer writes higher-level-language "source code" from which a computer software-configured to do so generates those machine instructions, or "object code."

FIG. 2 represents this sequence. FIG. 2's block 30 represents a compiler process that a computer performs under the direction of compiler object code. That object code is typically stored on the system disk 27 or some other machine-readable medium and by transmission of electrical signals is loaded into the system memory 24 to configure the computer system to act as a compiler. But the compiler object code's persistent storage may instead be in a server system remote from the machine that performs the compiling. The electrical signals that carry the digital data by which the computer systems exchange the code are exemplary forms of carrier waves transporting the information.

The compiler converts source code into further object code, which it places in machine-readable storage such as RAM 24 or disk 27. A computer will follow that object code's instructions in performing an application 32 that typically generates output from input. The compiler 30 is itself an application, one in which the input is source code and the output is object code, but the computer that executes the application 32 is not necessarily the same as the one that performs the compiler process.

The source code need not have been written by a human programmer directly. Integrated development environments often automate the source-code-writing process to the extent that for many applications very little of the source code is produced "manually." Also, it will become apparent that the term compiler is used broadly in the discussions that follow, extending to conversions of low-level code, such as the byte-code input to the Java virtual machine, that programmers almost never write directly. (Sun, the Sun Logo, Sun Microsystems, and Java are trademarks or registered trademarks of Sun Microsystems, Inc., in the United States and other countries. All SPARC trademarks are used under license and are trademarks of SPARC International, Inc. in the United States and other countries. Products bearing SPARC trademarks are based upon an architecture developed by Sun Microsystems, Inc.) Moreover, although FIG. 2 may appear to suggest a batch process, in which all of an application's object code is produced before any of it is executed, the same processor may both compile and execute the code, in which case the processor may execute its compiler application concurrently with-and, indeed, in a way that can be dependent upon-its execution of the compiler's output object code.

The various instruction and data sources depicted in FIG. 1 constitute a speed hierarchy. Microprocessors achieve a great degree of their speed by "pipelining" instruction execution: earlier stages of some instructions are executed simultaneously with later stages of previous ones. To keep the pipeline supplied at the resultant speed, very fast on-board registers supply the operands and offset values expected to be used most frequently. Other data and instructions likely to be used are kept in the on-board cache, to which access is also fast. Signal distance to cache memory 18 is greater than for on-board cache, so access to it, although very fast, is not as rapid as for on-board cache.

Next in the speed hierarchy is the system RAM 22, which is usually relatively large and therefore usually consists of relatively inexpensive, dynamic memory, which tends to be significantly slower than the more-expensive, static memory used for caches. Even within such memory, though, access to locations in the same "page" is relatively fast in comparison with access to locations on different pages. Considerably slower than either is obtaining data from the disk controller, but that source ordinarily is not nearly as slow as downloading data through a communications link 28 can be.

The speed differences among these various sources may span over four orders of magnitude, so compiler designers direct considerable effort to having compilers so organize their output instructions that they maximize high-speed-resource use and avoid the slowest resources as much as possible. This effort is complicated by the common programming technique of dividing a program up into a set of procedures directed to respective specific tasks.

Much of that complication results from procedures that invoke other, lower-level procedures to accomplish their work. That is, various "caller" procedures transfer control to a common, "callee" procedure in such a way that when the callee exits it returns control to whatever procedure called it. From the programmer's viewpoint, this organization is advantageous because it makes code writing more modular and thus more manageable. It also provides for code re-use: a common procedure need not be copied into each site at which it is to be used. This means that any revisions do not have to be replicated at numerous places. But such an organization also adds overhead: the caller's state must be stored, cache misses and page faults can occur, and processor pipelines often have to be flushed. In other words, the system must descend the speed hierarchy.

So optimizing compilers often "inline" short or frequently used procedures: they copy the procedure's body—without the procedure prolog and epilog—into each site at which the source code calls it. In other words, the compiler may sacrifice re-use for performance. But the programmer still benefits from code-writing modularity. Inlining has an additional important benefit: compiling the inlined procedure in a specific calling context exposes more information to an optimizing compiler and thereby allows the optimizer to generate more-efficient machine code.

Certain of the more-modern programming languages complicate the inlining process. To appreciate this, recall the basic features of object-oriented languages. In such languages, of which the Java programming language and C++ are examples, the code is written in terms of "objects,"

which are instances of "classes." A class's definition lists the "members" of any object that is an instance of the class. A member can be a variable. Or it can be a procedure, which in this context is typically called a "method."

FIG. 3 illustrates a way in which one may employ the Java programming language to define classes. Its first code segment defines objects of a class A as including, among other things, respective floating-point-variable members h and w and a method member m1 that (in the example) operates on the object's member variables to return a floating-point value representing their product. Every instance of class A will have its respective member variables h and w, and there will also be a method whose name is m1 that can be called on that instance (although, as will be discussed below, that method may not perform the same operation for all instances).

FIG. 4 illustrates m1's use. Being a class member, method m1 can be invoked only by being "called on" an instance of that class. So the first statement of FIG. 4's left code fragment declares variable a to contain a reference to an object of class A. It also allocates memory to an object of that class and initializes variable a with a reference to the newly allocated class A object. The two statements after that place values in that object's two member variables. The last statement passes the object reference in variable a to a procedure foo.

This object reference can be passed to that procedure because, as the right code fragment indicates, foo was defined as having a parameter of type A, and variable a belongs to that class. As that code indicates, foo's definition calls method m1 on its parameter o. This is legal because a method of that name is a member of class A. So when the object reference in variable a is passed to procedure foo, method m1 is performed on that object's values of variables h and w.

A central feature of such object-oriented languages is "inheritance." One can declare in a new class definition that the new class is a "child" of another, "parent" class. The extends keyword in FIG. 3's definition of class B declares that class's child relationship to class A. This means that all objects of class B are considered also to be objects of the parent class, although the reverse is not necessarily true. Since they also belong to class A, all objects of class B will include respective values of member variables h and w and can have method m1 called on them. This is true even though class B's definition does not explicitly list those members: class B inherits them from class A. So the compiler will permit an object b of class B to be passed to foo even though foo's signature requires that its parameter be a reference to an object of class A.

As described so far, the inheritance mechanism does not particularly complicate the inlining process. The compiler simply copies into foo's object code the object code that results from method m1's definition in class A, and that inlined code can be used even though foo is sometimes passed references to objects of class B.

But now consider FIG. 3's definition of class C. That definition "overrides" inherited method m1. Because it is a child of class A, class C necessarily includes a member method m1, but class C gives that method a definition different from its definition for other objects of class A. So when foo is passed an object c of class C—as is legal since class C is class A's child—the call of method m1 on object o requires code different from the code required when foo is passed some other objects of class A. Methods permitted to be overridden are called "virtual," and virtual methods that have been overridden are called "polymorphic." Calls to such methods are called "virtual calls," which are distinguished by the fact that the location of the called method must be computed at run time. Consequently, directly inlining one form of a polymorphic method can yield incorrect results.

Aggressive optimizing compilers nonetheless inline polymorphic methods in some instances. They avoid incorrect results by "guarding" the inlined code with a test to determine whether the inlined form of the method is consistent with the specific class of the "receiver" object on which the method is called. FIG. 5 is a code fragment consisting of SPARC microprocessor assembly code that exemplifies such inlining.

Let us assume that a microprocessor register g0 always contains a zero value and that another microprocessor register i1 contains the address of the receiver object. Then execution of FIG. 5's first instruction places the receiver object's address into microprocessor register o0. Object-allocating code generated by a typical object-oriented compiler places a pointer to the object's class in a location at a predetermined offset from the beginning of the memory space allocated to that object. Here we assume for the sake of example that the class pointer occupies an object's first location—i.e., that the offset is zero—so execution of FIG. 5's second instruction places the pointer to the receiver object's class into microprocessor register g2. If we further assume that the address of the inlined method's class is, say, $480002C8_{16}$ (=$120000_{16} \times 2^{10} + 712_{10}$), then the third and fourth instructions represent loading that class's address into microprocessor register g1.

If execution of the fifth instruction reveals that the resultant contents of microprocessor registers g1 and g2 are equal, i.e., that the object's class is the same as the class in which the inlined method is defined, execution continues through the inlining, which the drawing represents with an ellipsis. The instruction after the ellipsis causes the microprocessor to jump over that method's virtual call, which begins with the second instruction after the ellipsis.

On the other hand, if execution of the fifth instruction reveals that the object's class differs from the one in which the inlined method is defined, execution of the sixth instruction results in the microprocessor's jumping over the inlining to the virtual call. Suppose that a pointer to the polymorphic method is located at a given offset—say, 92 locations—from the beginning of any class of which it is a member. Then the second instruction after the ellipsis begins the virtual call by causing the microprocessor to load the address of the receiver object's version of that method into microprocessor register g3. The instruction after that causes the microprocessor to jump to that address while leaving in register o7 the address of the jump instruction, i.e., of the address to which the callee can add eight to obtain the address to which it should return control after its execution.

We assume that the inlined method would have left its result in register l0, so FIG. 5's last instruction directs the microprocessor to take the method's return value from register o0 and place it into register l0. The result's location is thereby independent of whether the inline path was taken. Execution then continues at the same point as it does at the end of the inlined method.

So using a guard enables a compiler to give its generated code the benefits of method inlining even if the method involved is polymorphic.

SUMMARY OF THE INVENTION

The present invention arises from the recognition that performance of code that results from virtual inlining can be improved in a wide variety of situations and that the improvement can be obtained by departing from the traditional approach to guarding. Instead of the traditional guarding technique, which will be referred to as the "class test," the present invention employs what will be called a "method test."

The method test takes advantage of the receiver object's virtual-function-table entry for the polymorphic method. The memory allocated to an object by object code that a typical object-oriented compiler generates contains, among other information, entries from which one can find pointers to the functions that can be called on the object. In the case of a polymorphic method overridden by a class to which the object belongs, the pointer is the address of the method's overriding form, not its overridden one.

The present invention's method test takes advantage of this feature. Instead of comparing the object's class entry with the address of the inlined method's defining class, the method test compares the address of the method that was inlined with the receiver object's pointer to the same-named method. As will become apparent from the description below, this approach is more accurate than the class test, and it can result in significant performance advantages in many circumstances.

BRIEF DESCRIPTION OF THE DRAWINGS

The invention description below refers to the accompanying drawings, of which:

FIG. 3, discussed above, is a source-code listing that sets forth typical class declarations;

FIG. 4, discussed above, is a source-code listing that illustrates the use of an object that is an instance of a class declared in FIG. 3;

FIG. 5, discussed above, is an assembly-code listing that illustrates conventional guarded inlining;

FIG. 7 is an assembly-code listing of a code fragment that performs guarded inlining;

FIG. 8 is a diagram illustrating a typical object's data structure; and

DETAILED DESCRIPTION OF AN ILLUSTRATIVE EMBODIMENT

Figure 6A:
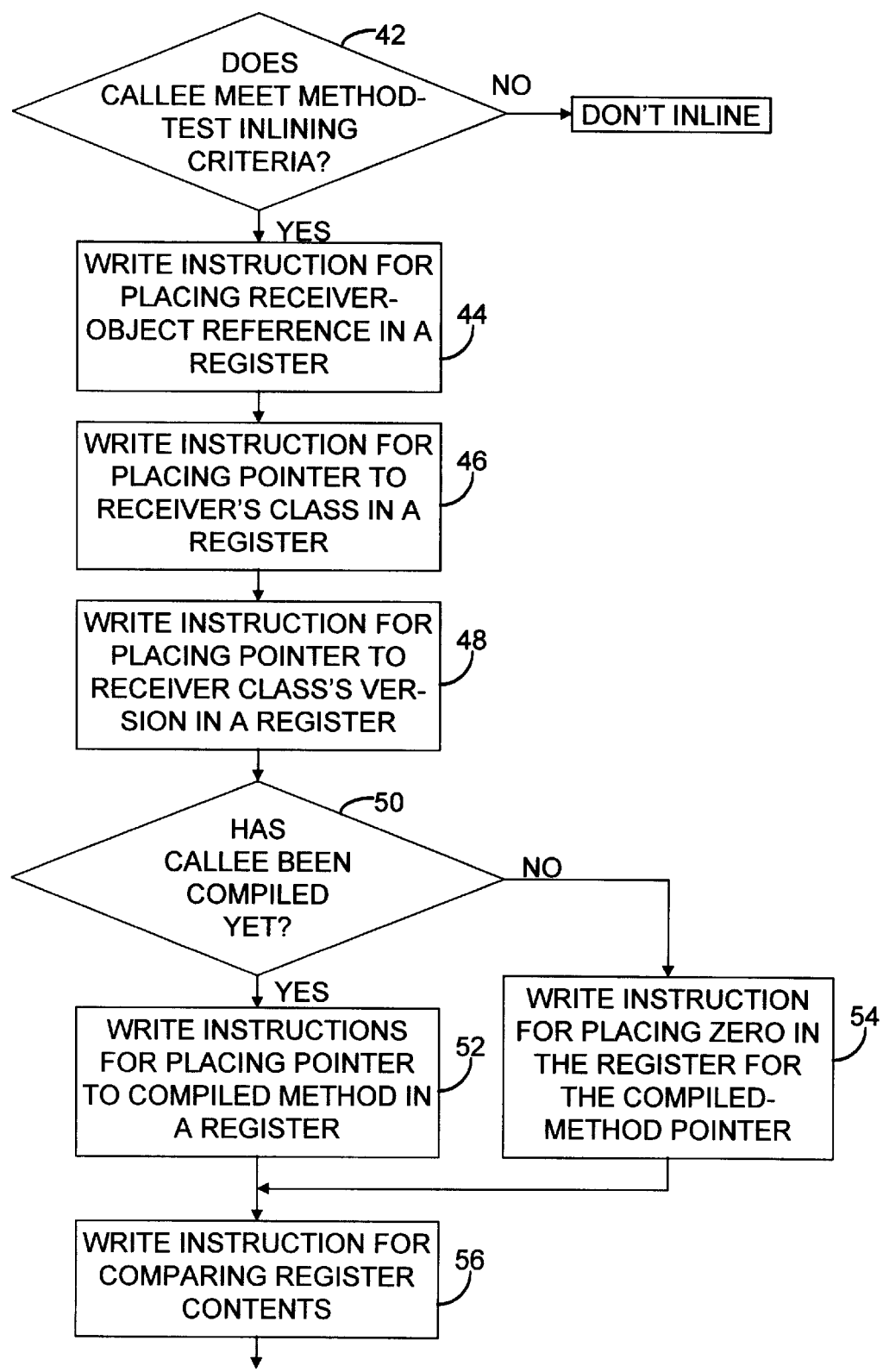
FIGS. 6A and B together form a simplified flow chart of a process for generating code for guarded inlining that implements the present invention's teachings.

When a compiler that implements the present invention's method-based guarding encounters a method call in the source code that it is compiling, it first determines whether that method meets criteria for method-guarded inlining. FIG. 6A's block 42 represents this determination. The criteria on which the determination is based are largely imposed by compiler policy. For example, the compiler may inline only methods that are shorter than a predetermined number of instructions. And some compilers may perform guarded inlining only if the method is not yet polymorphic, i.e., only if the compiler has not yet loaded a class that includes another version of the method. Whatever the criteria are, the compiler simply proceeds to write machine instructions for a virtual function call if the criteria are not met.

Otherwise, the compiler begins writing instructions for guarding the inlining. FIG. 6A's blocks 44 and 46 represent writing the first two instructions, and FIG. 7 is a code fragment consisting of SPARC microprocessor assembly code that begins with those first two instructions. As FIG. 5 does, FIG. 7 represents code into which FIG. 4's last method call o.m1( ) can be compiled. FIG. 7's first two instructions are the same as those of FIG. 5: FIG. 5's class-based test and FIG. 7's method-based test both start with a reference to the receiver object and obtain from it the address of the most-specific class to which that object belongs.

What is meant by a reference to the receiver object depends on the particular compiler implementation, but FIG. 8 is a simplified illustration of one example. FIG. 8 depicts a memory block 34 allocated to that object, and references to that object in the example code are pointers to that block's first location. Among that block's fields is a pointer 36 to the beginning of a memory block 38 allocated to the most-specific class to which the receiver object belongs.

That memory block contains various information about the class, such as its name, any parent, and, of particular interest here, a virtual-function table. The virtual-function table contains pointers to the methods that can be called on instances of that class, such as the receiver object. In particular, it contains a pointer 40 to the version of method m1 that the receiver object should use.

To determine whether to use the inlined code in such a compiler implementation, the class test exemplified by FIG. 5's previously described third through sixth instructions compares (1) the address of a class structure representing the class in which the inlined method is defined with (2) the contents of the object block 34's first, class-pointer field 38, i.e., with the address of a class structure representing the most-specific class to which the receiver object belongs. If those addresses are the same, then the inlined version of the polymorphic method is the version appropriate to the receiver object: the processor should follow the inlined code.

In contrast, the method test that FIG. 7 exemplifies makes that determination by its sixth instruction's comparison of (1) the contents of the method pointer 40 computed in accordance with FIG. 7's third instruction—i.e., of the address of the version of method m1 appropriate to the receiver object—with (2) the address, loaded in accordance with FIG. 7's fourth and fifth instructions, of the method that has been inlined. Clearly, equality of those addresses indicates that the processor should follow the inlined code, and that is the result of FIG. 7's seventh, branch instruction.

For the sake of simplicity, we assume here that only a single version of the method is inlined at any call site. But the present invention can be implemented in a compiler that inlines more than one version. In that case, a comparison would be performed for each, and an equality determination in any comparison would result in the processor's following the associated inlined-code version.

FIG. 6A's block 48 represents the compiler's operation of writing FIG. 7's third instruction, while blocks 50 and 52 represent writing the fourth and fifth instructions. Specifically, block 50 represents the compiler operation of determining whether the regularly compiled code for the method version to be inlined is available yet; in a dynamic compiler, it may not be. If it is not, its location cannot be placed in the register, so the compiler instead writes an instruction for placing a zero in the register containing the compiled method's location, as block 54 indicates. Later, when that method has been compiled, the compiler will return and replace the instruction written by step 54 with one written in accordance with step 52. In the interim, the test will harmlessly fail, causing the normal virtual call to be executed.

Figure 6B:
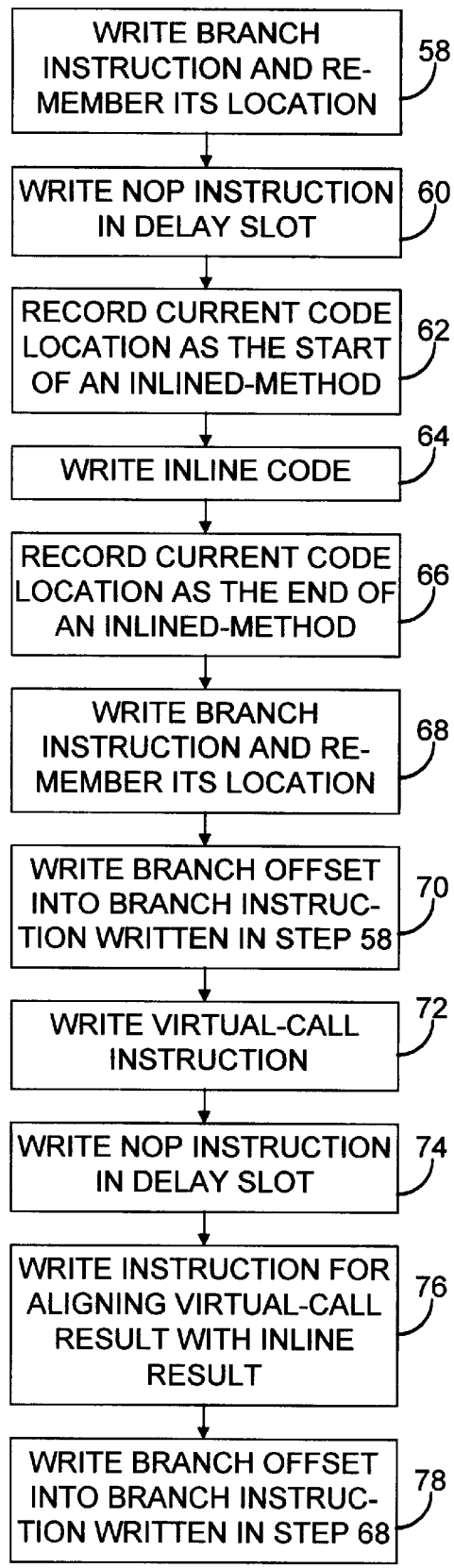

Block 56 represents writing the comparison instruction in FIG. 7's sixth line, i.e., the instruction for comparing the address of the version of method m1 appropriate to the receiver object with the address of the method that has been inlined. FIG. 6B's block 58 represents writing FIG. 7's seventh instruction, which causes the microprocessor to branch on the result of that comparison. Specifically, the microprocessor should merely proceed with the next instruction—and thereby continue through the inlined code—if the compared addresses are equal. If they are not, the microprocessor's program counter should jump to the location that contains the virtual call. At this point, though, the compiler does not know what that location will be. So it remembers the branch instruction's location and will later complete that instruction with the offset of the call's address when that information becomes available.

Block 60 merely represents writing FIG. 7's eighth, no-operation instruction in the "delay slot" implemented by the particular microprocessor for which the illustrated code is intended. The compiler can then start to generate code for the method being inlined. Before it does so, though, it notes the location at which the inlined code starts and records in a separate structure the name of the method that was inlined, as block 62 indicates. The debugger will use this information to make the inlining transparent to the programmer in debugging listings.

Blocks 64 and 66 represent then writing the code being inlined and remembering the location of its last instruction for debugging purposes. When the microprocessor employs the inlined code, it should skip the virtual-call instruction, and block 68 represents writing FIG. 7's ninth instruction, which directs the microprocessor to skip the virtual call and certain accompanying instructions. Since the compiler does not yet know the address of the instruction that will follow those instructions, it remembers the ninth instruction's location so that it can later fill in the branch offset to specify the location to which control should be transferred.

The next location will receive the virtual call. This is the instruction to which control should be transferred from FIG. 7's seventh instruction if the result of the sixth instruction's execution indicates that executing the inlined code is not appropriate. So, as block 70 indicates, the compiler can now place the branch offset in the instruction written in the block-58 step. And the compiler can then write FIG. 7's tenth, virtual-call instruction, as block 72 indicates. Block 74 represents filling the subsequent delay slot.

In the example, the virtual method's result does not occupy the same register as the inlined code's does, but code that follows those that result from the method call's compilation should operate independently of whether the executing microprocessor has used the inlined code or the code to which the virtual call directs it. So execution of FIG. 7's twelfth instruction, which the compiler writes in step 76, aligns those results by placing the virtual call's result in the register that the inlined code's result would occupy.

Inspection of the caller code that follows the inlining in FIGS. 5 and 7 indicates that they are the same with the exception that FIG. 5's ninth instruction loads the virtual call's target into register g3, whereas FIG. 7's third instruction performs that operation.

The output-alignment instruction is the last one that should be skipped by a microprocessor that has executed the inlined code, so the next instruction's location is the one to which FIG. 7's ninth instruction should branch, and the compiler fills in the ninth instruction's branch offset accordingly, as FIG. 6B's block 78 indicates. The guarded inlining is now complete.

Experiments have indicated that code compiled in accordance with the present invention should ordinarily perform considerably better than code that employs class-test guarding. The reason for this better performance may not be immediately apparent, since a comparison of FIG. 5 with FIG. 7 reveals that the method test requires an extra load operation if both approaches result in using the inlined code. To understand the method test's superiority, it helps to consider a class hierarchy such as that of FIG. 9, in which dots represent member relationships, whereas arrows represent parent-child relationships.

Figure 1:
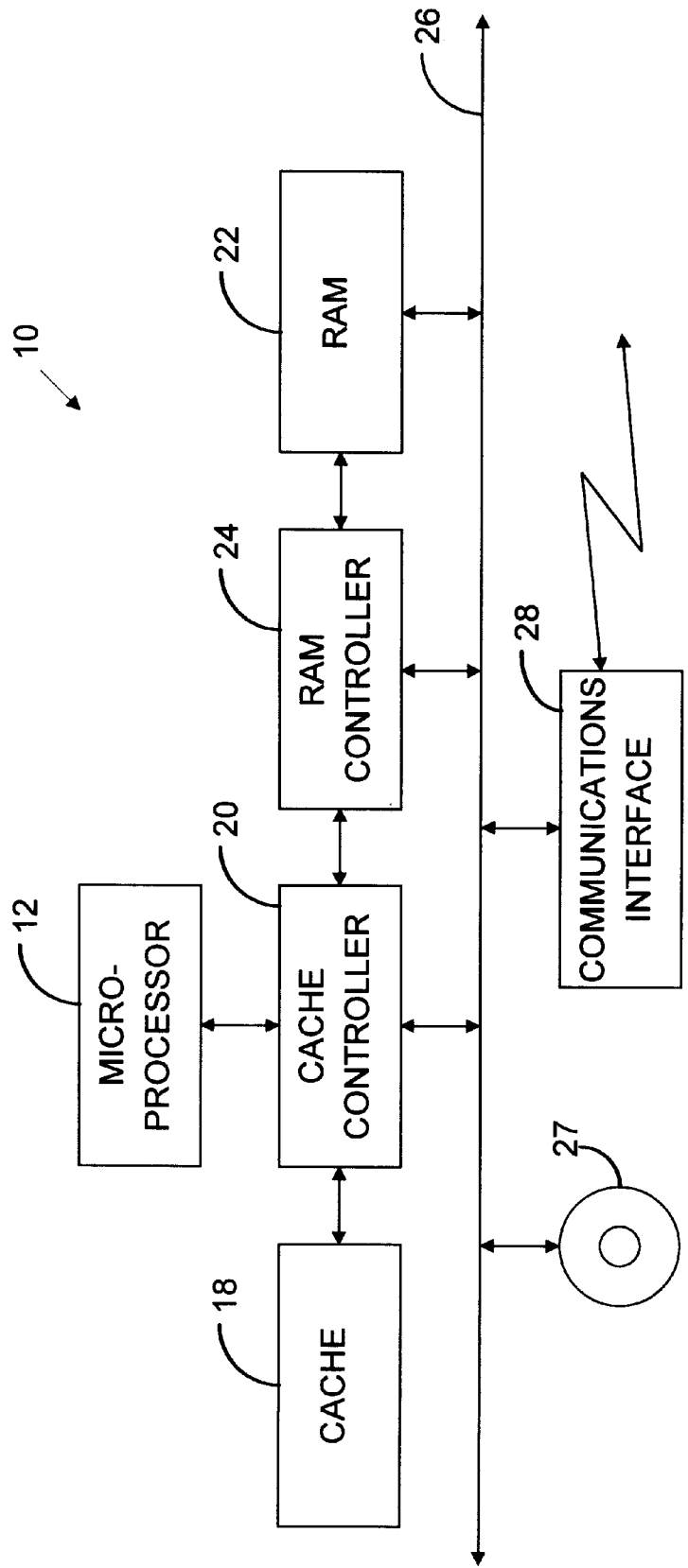
FIG. 1, discussed above, is a block diagram of a typical computer system of the type that can be configured to compile a source program.
Figure 9:
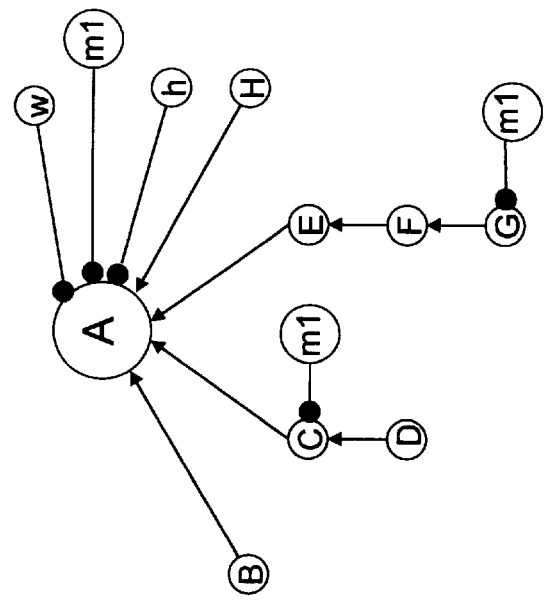
FIG. 9 is a diagram of an example class hierarchy used to illustrate the present invention's features.
Figure 2:
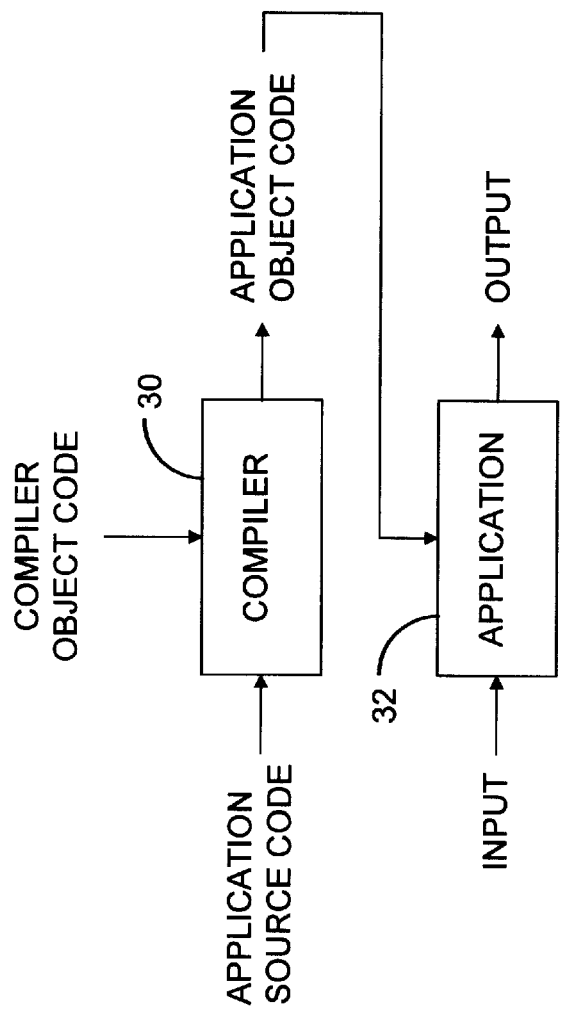
FIG. 2, discussed above, is a block diagram of the progression from source code to application execution.

FIG. 9's class A includes a virtual method m1, and we will assume that some invocation a.m1( ) is inlined when the calling method is compiled and that the static type of variable a is class A. As FIG. 9 indicates, class A is an ancestor of seven descendant classes B–H. Descendant classes C and G override method m1, so the inlined code should not be used when method m1 is called on instances of those classes or class C's descendant class D, which inherits class C's overriding of method m1. But a class test based on a comparison with a reference to class A will additionally prevent the inlined code's use for instances of any other descendant class, even though they all use the same version of method m1 as class A.

If most calls of method ml are made on instances of these descendants, the inlined code will be followed in only a small fraction of the cases in which it would have been appropriate to do so, so the costly procedure call will often be made unnecessarily. In contrast, the present invention's method test will cause the inlined code to be followed in every appropriate case: the method test is much more accurate.

To an extent, the class test's disadvantages can be reduced by simply having the guard code include an additional test for each class in which the inlined code is appropriate. But such a compound test quickly becomes unwieldy as the number of alternative classes increases. (The foregoing example may suggest reducing the guard-code size by instead testing for those classes that are not appropriate; in the example, there are only three of those. But this alternative is not preferable in general, and it is unsafe in dynamic compiling environments of the type that will be described presently.)

Even in situations in which actually performing a compound test is not too unwieldy, providing it can be impossible in some of the more-dynamic compilation environments, such as some web browsers' "just-in-time" applet-code compilation. Such code is typically downloaded in the form of class files that have references to methods in other class files. It is advantageous for methods in the first-loaded class files to begin execution before the referent class files have been downloaded. Indeed, the browser may postpone the referent class file's downloading until such time, if any, as an already-downloaded method's execution reaches a call to the referent class file's code.

In such a context, the compiler often will not "know" at the time of the initial inlining what other classes inherit the inlined method without overriding it. Indeed, the compiler's policy may be to inline only those virtual methods that at the time of their initial compilation are not yet polymorphic. So objects of subsequently loaded classes will not be able to take advantage of class-test-guarded inlining unless the guard site is recompiled to refer to them. If FIG. 9's classes B and H have not been loaded at the time when a call to A.m1( ) is compiled, there is no way in which a class test can be constructed that executes the inlined code for later receiver objects of those classes. In contrast, such classes can take advantage of method-test-guarded inlining without guard-code revision.

This does not mean that none of the present invention's embodiments will ever revise their guard code. Some embodiments may so operate as sometimes to inline a method's code—and allow the inlined site to execute—before the compiler has compiled that method into its normal procedure form, i.e., before the method has an address to put into the guard code. When it inlines such a not-yet-compiled method, the compiler may place a null value in the guard-code location that would ordinarily contain the method reference. So comparisons with receiver objects' method references fail, and the inlined code will not initially be used.

But such a compiler will also record for later use the address of the inlined code's reference-containing location. For example, it may record that address in the downloaded form of the class file that contains the method's source code. Then, when the compiler does compile the method and therefore has an address for it, it enters the resultant address into all locations thus recorded against that method.

The method test is also quite versatile; it can be used not only in a high-level-language compiler but also in compilers from some types of lower-level source code.

Although much of the code transferred as web-page applets is initially written in a the high-level Java programming language, it is actually transmitted in a lower-level, "virtual-machine" language. In that language, the receiver object's specific class is not readily inferred from the virtual-machine-language expression of the invocation of a method on that class, whereas that expression explicitly refers to the specific form of the polymorphic method. So such a language lends itself more readily to inlining by way of a method test.

It is thus apparent that the present invention's advantages can be realized in a wide range of embodiments. It therefore constitutes a significant advance in the art.

What is claimed is:

1. A computer system configured by machine-readable instructions to:
    A) read electrical signals representing a source-code calling procedure that calls a polymorphic method on a variable object;
    B) compile the source-code calling procedure into an object-code calling procedure by:
        i) placing inlined object code for at least one form of the polymorphic method into the object-code procedure; and
        ii) guarding the inlined object code for each such form of the polymorphic method with guard code that directs a machine executing it to:
            a) perform a comparison of the address of the one form of the polymorphic method with the called-on object's virtual-function-table entry for that method; and
            b) skip the inlined object code if the comparison is negative; and
    C) store the object-code calling procedure in a machine-readable storage medium.

2. A computer system as defined in claim 1 wherein:
    A) the computer system is further configured to place a virtual function call of the polymorphic method into the object-code calling procedure; and
    B) the guard code directs the executing machine to the virtual finction call if each comparison performed for an inlined form of the method is negative.

3. A computer system as defined in claim 2 further configured to execute the object-code calling procedure.

4. A computer system as defined in claim 1 further configured to execute the object-code calling procedure.

5. A computer system comprising:
    A) means for reading electrical signals representing a source-code calling procedure that calls a polymorphic method on a variable object;
    B) means for compiling the source-code calling procedure into an object-code calling procedure by:
        i) placing inlined object code for at least one form of the polymorphic method into the object-code procedure; and
        ii) guarding the inlined object code for each such form of the polymorphic method with guard code that directs a machine executing it to:
            a) perform a comparison of the address of the one form of the polymorphic method with the called-on object's virtual-function-table entry for that method; and
            b) skip the inlined object code if the comparison is negative; and
    C) means for storing the object-code calling procedure in a machine-readable storage medium.

6. A computer system as defined in claim 5 wherein:
    A) the computer system further comprises means for placing a virtual function call of the polymorphic method into the object-code calling procedure; and
    B) the guard code directs the executing machine to the virtual function call if each comparison performed for an inlined form of the method is negative.

7. A computer system as defined in claim 6 further comprising means for executing the object-code calling procedure.

8. A computer system as defined in claim 5 further comprising means for executing the object-code calling procedure.

9. A method of generating object code comprising the steps of:
    A) reading electrical signals representing a source-code calling procedure that calls a polymorphic method on a variable object;
    B) compiling the source-code calling procedure into an object-code calling procedure by:
        i) placing inlined object code for at least one form of the polymorphic method into the object-code procedure; and
        ii) guarding the inlined object code for each such form of the polymorphic method with guard code that directs a machine executing it to:
            a) perform a comparison of the address of the one form of the polymorphic method with the called-on object's virtual-function-table entry for that method; and
            b) skip the inlined object code if the comparison is negative; and
    C) storing the object-code calling procedure in a machine-readable storage medium.

10. A method as defined in claim 9 wherein:
   A) the method further comprises placing a virtual function call of the polymorphic method into the object-code calling procedure; and
   B) the guard code directs the executing machine to the virtual function call if each comparison performed for an inlined form of the method is negative.

11. A method as defined in claim 10 further comprising the step of executing the object-code calling procedure.

12. A computer system as defined in claim 9 further comprising the step of executing the object-code calling procedure.

13. A computer data signal embodied in a carrier wave and representing a sequence of instructions that, when executed by a computer system, configures the computer system to:
   A) read electrical signals representing a source-code calling procedure that calls a polymorphic method on a variable object;
   B) compile the source-code calling procedure into an object-code calling procedure by:
      i) placing inlined object code for at least one form of the polymorphic method into the object-code procedure; and
      ii) guarding the inlined object code for each such form of the polymorphic method with guard code that directs a machine executing it to:
         a) perform a comparison of the address of the one form of the polymorphic method with the called-on object's virtual-function-table entry for that method; and
         b) skip the inlined object code if the comparison is negative; and
   C) store the object-code calling procedure in a machine-readable storage medium.

14. A computer data signal as defined in claim 13 wherein:
   A) the instructions represented by the computer data system further configure the computer system to place a virtual function call of the polymorphic method into the object-code calling procedure; and
   B) the guard code directs the executing machine to the virtual finction call if each comparison performed for an inlined form of the method is negative.

15. A computer data signal as defined in claim 14 wherein the instructions represented by the computer data system further configure the computer system to execute the object-code calling procedure.

16. A computer data signal as defined in claim 13 wherein the instructions represented by the computer data system further configure the computer system to execute the object-code calling procedure.

17. A storage medium containing instructions readable by a computer system to configure the computer system to:
   A) read electrical signals representing a source-code calling procedure that calls a polymorphic method on a variable object;
   B) compile the source-code calling procedure into an object-code calling procedure by:
      i) placing inlined object code for at least one form of the polymorphic method into the object-code procedure; and
      ii) guarding the inlined object code for each such form of the polymorphic method with guard code that directs a machine executing it to:
         a) perform a comparison of the address of the one form of the polymorphic method with the called-on object's virtual-function-table entry for that method; and
         b) skip the inlined object code if the comparison is negative; and
   C) store the object-code calling procedure in a machine-readable storage medium.

18. A storage medium as defined in claim 17 wherein:
   A) the instructions that the storage medium contains further configure the computer system to place a virtual finction call of the polymorphic method into the object-code calling procedure; and
   B) the guard code directs the executing machine to the virtual function call if each comparison performed for an inlined form of the method is negative.

19. A storage medium as defined in claim 18 wherein the instructions that the storage medium contains further configure the computer system to execute the object-code calling procedure.

20. A storage medium as defined in claim 17 wherein the instructions that the storage medium contains further configure the computer system to execute the object-code calling procedure.

21. For compiling into an object-code calling procedure a source-code calling procedure that calls a polymorphic method on a variable object, a computer system configured by machine-readable instructions to:
   A) place inlined object code for at least one form of the polymorphic method into the object-code calling procedure; and
   B) guard the inlined object code for each such form of the polymorphic method with guard code that directs a machine executing it to:
      i) perform a comparison of the address of the one form of the polymorphic method with the called-on object's virtual-function-table entry for that method; and
      ii) skip the inlined object code if the comparison is negative.

22. A computer system as defined in claim 21 wherein the computer system is further configured to place a virtual function call of the polymorphic method into the object-code calling procedure and wherein the guard code directs the executing machine to the virtual function call if each comparison performed for an inlined from of the method is negative.

23. A computer system as defined in claim 22 further configured to execute the object-code calling procedure.

24. A computer system as defined in claim 21 further configured to execute the object-code calling procedure.

* * * * *